(12) United States Patent
Werfel et al.

(10) Patent No.: US 7,048,824 B1
(45) Date of Patent: May 23, 2006

(54) DEVICE FOR TREATING SILICON WAFERS

(75) Inventors: Frank Werfel, Leipzig (DE); Jürgen Seeberger, Passau (DE)

(73) Assignee: Gebrüder Decker GmbH & Co. KG, Nürnberg (DE)

( * ) Notice: Subject to any disclaimer, the term of this patent is extended or adjusted under 35 U.S.C. 154(b) by 483 days.

(21) Appl. No.: 09/959,495

(22) PCT Filed: Apr. 13, 2000

(86) PCT No.: PCT/EP00/03351

§ 371 (c)(1),
(2), (4) Date: Oct. 29, 2001

(87) PCT Pub. No.: WO00/65637

PCT Pub. Date: Nov. 2, 2000

(30) Foreign Application Priority Data

Apr. 27, 1999 (DE) .................. 199 18 922
Dec. 9, 1999 (DE) .................. 199 59 299

(51) Int. Cl.
*H01L 21/00* (2006.01)
*C23C 16/00* (2006.01)

(52) U.S. Cl. .................. 156/345.11; 156/345.55; 156/345.1; 156/345.23; 505/166; 310/90.5; 118/715

(58) Field of Classification Search ........... 156/345.11, 156/345.55, 345.1; 118/715; 505/166; 310/90.5
See application file for complete search history.

(56) References Cited

U.S. PATENT DOCUMENTS 3,610,978 A * 10/1971 Hermann .................. 310/163

| | | | | |
|---|---|---|---|---|
| 4,300,581 A | * | 11/1981 | Thompson ................. | 134/57 R |
| 4,727,724 A | * | 3/1988 | Intichar et al. ............. | 62/55.5 |
| 5,126,610 A | * | 6/1992 | Fremerey ................... | 310/90.5 |
| 5,554,583 A | * | 9/1996 | Hull et al. .................. | 505/166 |
| 5,630,881 A | * | 5/1997 | Ogure et al. ............... | 118/730 |
| 5,710,469 A | * | 1/1998 | Ries ......................... | 310/90.5 |
| 5,747,426 A | * | 5/1998 | Abboud ..................... | 505/166 |
| 5,757,098 A | * | 5/1998 | Higuchi et al. ............. | 310/90.5 |
| 5,787,813 A | * | 8/1998 | Reising ..................... | 101/479 |
| 5,871,588 A | * | 2/1999 | Moslehi et al. ............. | 118/730 |
| 6,022,413 A | * | 2/2000 | Shinozaki et al. .......... | 118/715 |
| 6,127,281 A | * | 10/2000 | Sakaguchi et al. ......... | 438/747 |
| 6,269,548 B1 | * | 8/2001 | Shinozaki et al. .......... | 34/58 |
| 6,365,997 B1 | * | 4/2002 | Werfel et al. .............. | 310/90.5 |
| 6,464,825 B1 | * | 10/2002 | Shinozaki ............... | 156/345.55 |

FOREIGN PATENT DOCUMENTS

| EP | 0 570 967 A1 | 11/1993 |
|---|---|---|
| JP | 05238683 A * | 9/1993 |
| JP | 08001475 A * | 1/1996 |

* cited by examiner

*Primary Examiner*—Ram N Kackar
(74) *Attorney, Agent, or Firm*—Browdy and Neimark, PLLC

(57) ABSTRACT

A device (1) for treating objects, in particular silicon wafers (2), with a fluid (3), comprising a container (4) that holds the fluid (3); a rotatable carrying arrangement (5) for accommodation of the objects to be treated, which is disposed at least partially in the container (4); and a rotatably drivable shaft, which is run on at least one bearing (13, 14) and joined to the carrying arrangement (5); with the bearing (13, 14) including a first bearing member (22), which is joined to the shaft, and a second bearing member (24), which adjoins the first bearing member (22) and contains superconductive material; with the first bearing member (22) being kept spaced from the second bearing member (24) by magnetic forces.

29 Claims, 9 Drawing Sheets

DEVICE FOR TREATING SILICON WAFERS

REFERENCE TO RELATED APPLICATIONS

The present application is the national stage under 35 U.S.C. §371 of international application PCT/EP00/03351, filed Apr. 13, 2000 which designated the United States, and which application was not published in the English language.

The invention relates to a device for treating objects, in particular silicon wafers.

The enormous increase in semiconductor production has been a perpetual challenge in the development of individual process operations. This development becomes obvious from the capacity of memory chips and the line widths obtained, which, being in the range of 12 µm 25 years ago, have increased miniaturization nearly by the factor 10, based on today's envisaged 0.18 µm technology. As a result of the requirements given by miniaturization, the standards of apparatuses used in semiconductor technology are very high.

With lithographic fabrication processes perfected by enlarged numeric apparatuses, reduced light-wave lengths and improved varnish techniques, the pre-processes of cleaning, etching and drying have been subject to considerably less fundamental technological improvements. Reasons are the highly conservative steps of wet chemical or gaseous treatment, which are strongly fragmented.

Cleaning, engraving and drying have so far been the fundamental technical steps. This takes place by methods of dipping in chemical baths with direct or indirect cleaning in sound-incited or gas-loaded fluids. The preprocesses of etching and cleaning from contaminations or sub-micrometer particles on silicon wafers are highly critical, since the faulty areas will be further processed, ultimately leading to multiplied reduction in the yield of functioning components.

Cleaning, engraving and drying have so far been the fundamental technical steps. This takes place by methods of dipping in chemical baths with direct or indirect cleaning in sound-incited or gas-loaded fluids. The preprocesses of etching and cleaning from contaminations or sub-micrometer particles on silicon wafers are highly critical, since the faulty areas will be further processed, ultimately leading to multiplied reduction in the yield of functioning components.

In practice, more than 50 percent of yield loss in the production of integrated circuits are due to micro contamination on the silicon wafers. This means that wafer treatment in the pre-processes fundamentally affects the capacity of semiconductor circuits, productivity of fabrication and reproducibility and reliability of the components.

Owing to processes of interaction with the silicon surfaces, two types of wafer treatment are distinguished: wet chemical etching and wet chemical cleaning. Both processes are used in the production of wafers as a raw material as well as in the further processing by the chip producer.

Conventionally, wet chemical treatment takes place in dipping baths or chemical spraying plants, with highest demands being put on chemical purity as well as on the resistance and purity of the materials used, such as polytetrafluoroethylene (=PTFE) or poly vinylidene fluoride (=PVDF), and with absolute avoidance of particles having highest priority.

In dipping technique, packages of several wafers are dipped vertically into the baths that contain chemicals or rinsing agents. Circulations pumps serve to produce a flow directed from below upwards.

During the engraving process, as regular as possible an engraving homogeneity is to be obtained on the wafer surface. Due to the fact that wear-off particles will form in the required actuation components, a compromise has so far consisted in renouncing to rotating the silicon wafers. In many processes of semiconductor technology, the problem of wear-off of movable parts, in particular as a function of time, has meanwhile gained so much importance that wide fields of the pre-processes renounce to rotation.

The invention relates to a device for treating objects, in particular silicon wafers, according to the preamble of claim 1.

A device for the treatment of silicon wafers is known from EP 0 570 967 A1. The silicon wafers are exposed to several vacuum process operations. They are kept in a vacuum container which allows transport under vacuum conditions. Provided on the underside of the container is a vacuum valve which can be actuated by an electromagnet. No teaching can be taken from this on the treatment of silicon wafers in a fluid, accompanied with highest purity.

The enormous increase in semiconductor production has been a perpetual challenge in the development of individual process operations. This development becomes obvious from the capacity of memory chips and the line widths obtained, which, being in the range of 12 µm 25 years ago, have increased miniaturization nearly by the factor 10, based on today's envisaged 0.18 µm technology. As a result of the requirements given by miniaturization, the standards of apparatuses used in semiconductor technology are very high.

With lithographic fabrication processes perfected by enlarged numeric apparatuses, reduced light-wave lengths and improved varnish techniques, the pre-processes of cleaning, etching and drying have been subject to considerably less fundamental technological improvements. Reasons are the highly conservative steps of wet chemical or gaseous treatment which are strongly fragmented.

With all the rotating devices used so far for silicon wafers in the various steps of treatment, there is strong particle wear-off of the employed parts, gearwheels, plain bearings and roller bearings. For these reasons, semiconductor producers conventionally avoid rotating the wafers in critical fields, even if this means losses in the homogeneity of the treatment processes.

It is an object of the invention to embody a device for treating objects, in which uniform treatment of the objects is ensured, accompanied with highest purity.

This object is attained by the features of the characterizing part of claim 1. The gist of the invention resides in the non-contact lodging of a rotatably drivable carrying arrangement in superconductive magnetic bearings. The advantages thus obtained are numerous. The bearing position is self-stabilizing. Friction losses, in particular in the case of high speeds, are very low. No control system of the bearings is necessary apart from the cooling of the superconductors, which augments reliability. The shaft and the stationary bearing members may be sealed from each other vacuum-tight, which prevents the possibly highly aggressive fluid from penetrating into the stationary bearing member. The bearing arrangement exhibits special properties in the damping of undesired oscillations, which need no special control. The bearing possesses high indifference to unbalance. It is maintenance-free and has a high durability.

The advantage of the device according to claim 3 resides in that the shaft can simply be lifted out the stationary second bearing member and replaced.

Further advantageous embodiments of the invention will become apparent from the sub-claims.

Additional features and advantages of the invention will become apparent from the description of six exemplary embodiments, taken in conjunction with the drawing, in which FIG. 1 is a diagrammatic, perspective view of the invention in a first embodiment;

Figure 1:
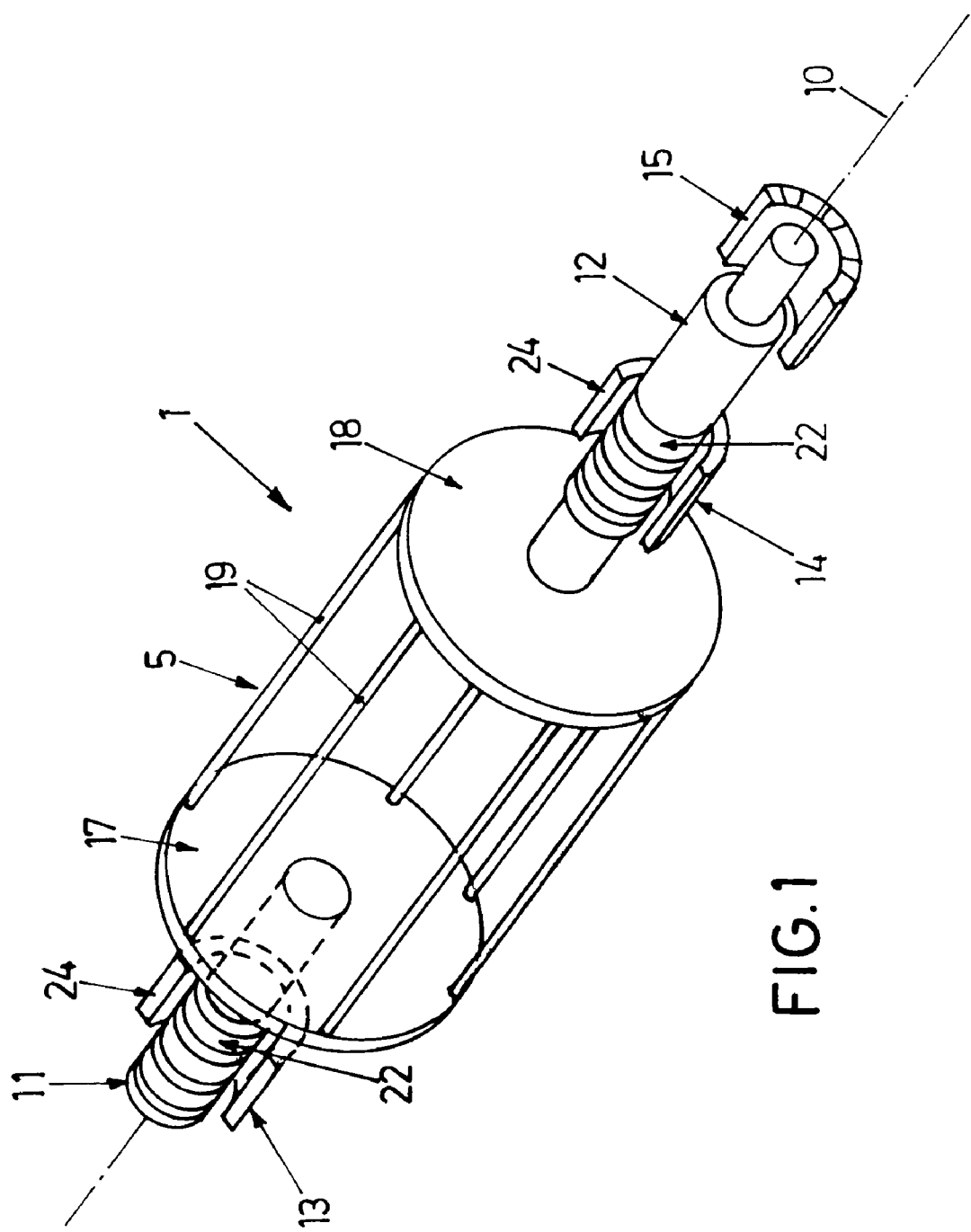
Figure 2:
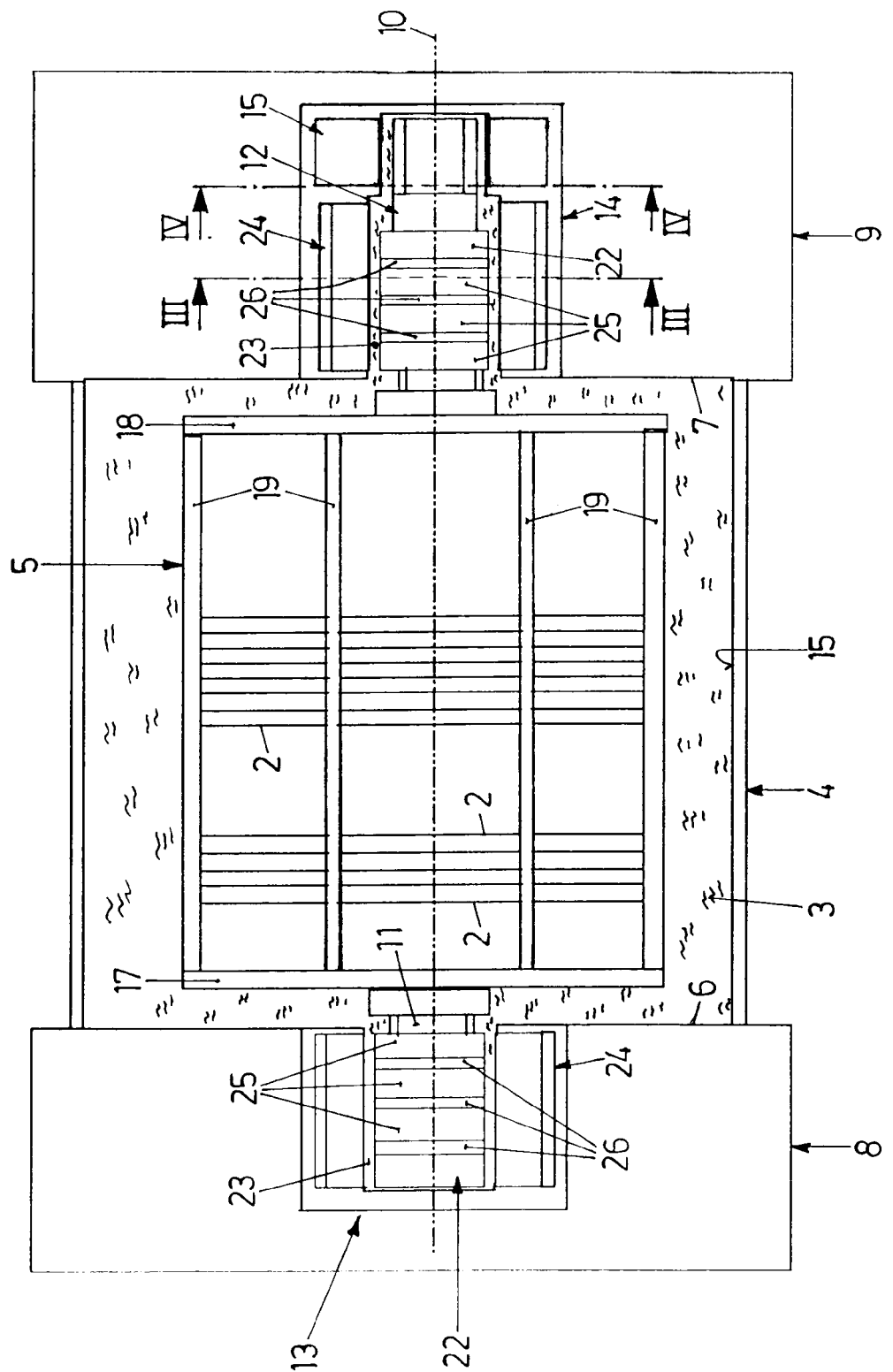
FIG. 2 is a plan view of the invention in a first embodiment.
Figure 3:
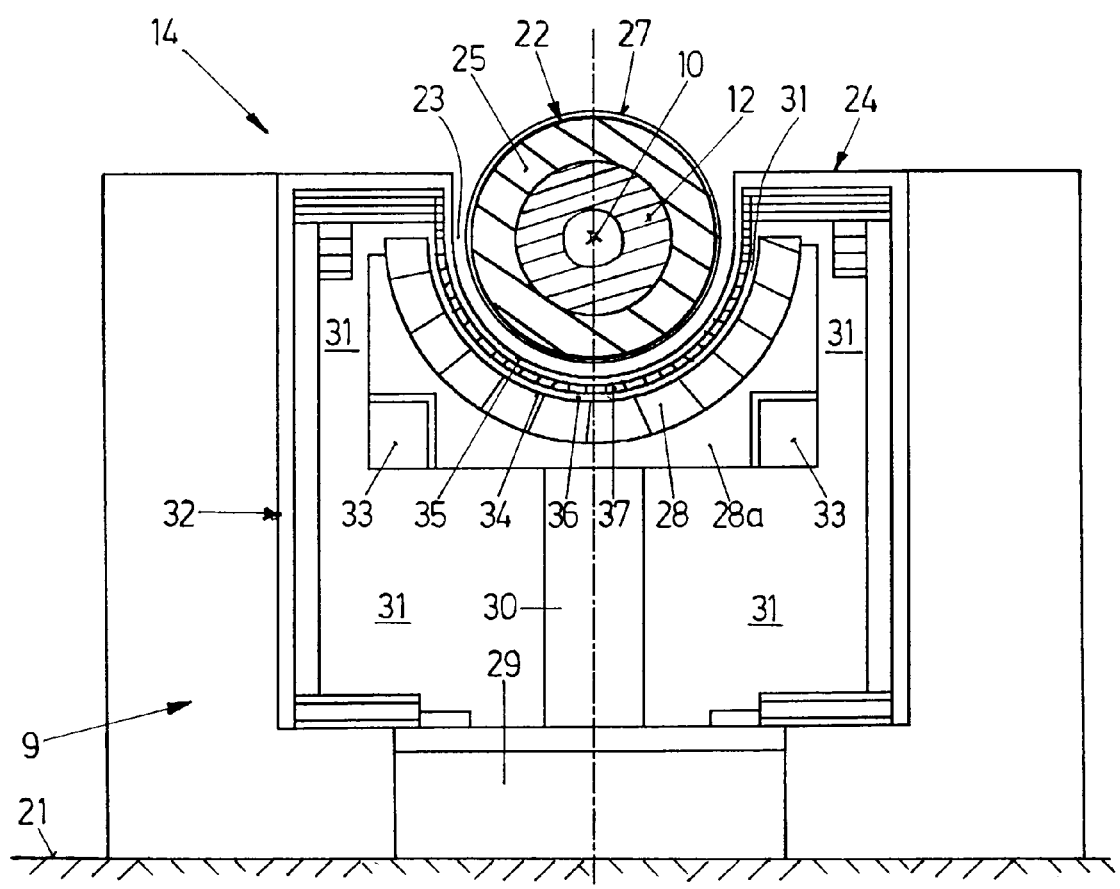
FIG. 3 is a sectional view on the line III—III of FIG. 2.
Figure 4:
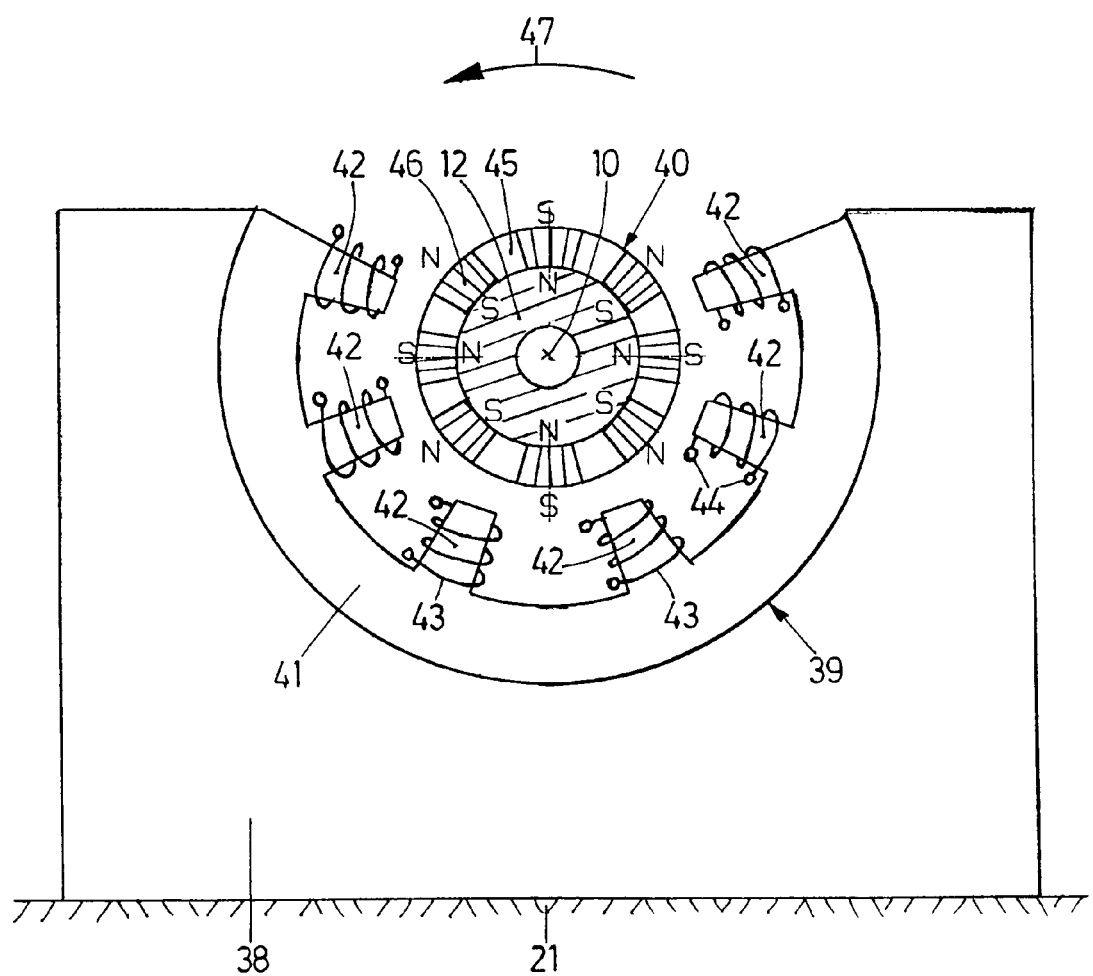
FIG. 4 is a sectional view on the line IV—IV of FIG. 2.

A first embodiment of the invention is described in the following, taken in conjunction with FIGS. 1 to 4. A device 1 serves for the wet chemical and gaseous treatment of objects, in particular silicon wafers 2, with a fluid 3. The device 1 comprises a container 4, which is, or is to be, filled with the fluid 3 and in which a carrying arrangement 5 is disposed for accommodation of the silicon wafers 2. The carrying arrangement 5 is lodged in two bearing blocks on the front ends 6, 7 of the container 4. To this end, a shaft butt 11 and a shaft-driving butt 12, which combine to form a shaft, are provided on the opposite sides of the carrying arrangement 5 concentrically of a substantially horizontal axis of rotation 10. The shaft butt 11 and the shaft-driving butt 12 are magnetically supported in bearings 13 and 14 which are provided in the bearing blocks 8 and 9. Further, a driving unit 15 is provided in the bearing block 9 for rotary actuation of the shaft.

The container 4 corresponds to familiar containers for the treatment of silicon wafers and is made of highly corrosion resisting plastic material. The containers 4 may be formed as a basin for liquid treatment or as a chamber for gas or spray treatment. Additionally, the container 4 is provided, on its inside, with a coating 16 of acidproof and, if possible, chemically inert material, in particular PTFE or PVDF. Various liquid or gaseous substances are used as a fluid 3, depending on the treatment job the silicon wafers are intended to be subject to.

The carrying arrangement 5 includes support disks 17, 18, which are parallel to each other and frontally concentric of the axis of rotation 10 and which are interconnected, along their circumference, via support rods 19 that run parallel to the axis of rotation 10. The support rods 19 have slots 20 which the silicon wafers 2 engage with, thus being held.

At least three supports rods 19 are provided. However, provision may also be made for additional support rods 19. One or several support rods 19 may be removed for the carrying arrangement 5 to be equipped with silicon wafers 2. The silicon wafers 2 fixed in the carrying arrangement 5 are disposed parallel to each other and concentrically of the axis of rotation 10. This helps ensure, upon revolution of the carrying arrangement 5 about the axis of rotation 10 in the fluid 3, that the surfaces of the silicon wafers 2 are exposed to the fluid 3 as uniformly as possible without the production of inhomogeneities or flaws. Use may also be made of other known carrying arrangements as described among others at the outset. The bearing blocks 8, 9 are supported on a machine bottom 21. The bearings 13 and 14, which are substantially identical, have a first bearing member 22 which is provided on the shaft butt 11 or the shaft-driving butt 12 concentrically of the axis of rotation 10. Second bearing members 24, which are separated from each other by a bearing clearance 23, are provided in the bearing blocks 8 and 9, enveloping the first bearing members 22 in part, in particular by 50 percent. Typically, the bearing clearance 23 has a width of 0.5 to 10 mm.

The first bearing member 22 comprises permanent ring magnets 25, which adjoin along the axis of rotation 10, concentrically enveloping the shaft-driving butt 12 and being joined thereto; adjacent ring magnets 25 either have an attracting (opposite poles) or a repelling magnetic force (similar poles) or a combination thereof so that a sequence of for instance S, N; N, S; S, N; N, S; . . . is produced along the axis of rotation 10, with N standing for the magnet north pole and S for the magnet south pole. The ring magnets 25 are made from SmCo, $Sm_2Co_{17}$ or NdFeB, which reaches the highest energy densities and a retentivity of 1.4 Tesla. However use may as well be made of other materials that have an important magnetic flux as permanent magnets. Annular disks 26 of great permeability of provided between the ring magnets 25 so that the magnetic flux in the bearing clearance 23 runs substantially perpendicular to the axis of rotation 10. Typically, the annular disks 26 have a thickness of 1 to 2 mm. For protection against the fluid 3 in the bearing clearance 23, the first bearing member 22 is provided with a protective coating 27 of the same material as the container coating 16. Consequently, the ring magnets 25, the annular disks 26 as well as the butts 11, 12 do not get in touch with the fluid 3.

The second bearing members 24 each have an upwardly open bearing shell 28 of superconductive material, which is parallel to the axis of rotation 10 and is surrounded by a cooling jacket 28a for maintenance of the superconductive condition, the cooling jacket 28a being connected to a cooling device 29 via a heat elimination line 30. The superconductive material is a melt extruded high temperature superconductor of the composition $ReBa_2Cu_3O_x$, with Re=Sm, Nd, Y. The fabrication of melt extruded high temperature superconductors is described in Werfel, Flögel-Delor, Wippich, "YBaCuO Large Scale Melt Texturing in a Temperature Gradiant", Inst. Phys. Conf. Ser. No. 158, pages 821 f., 1997, to which reference is made. The critical current density is greater than 30 $kA/cm^2$. Grain sizes and grain boundaries produce special hysteresis and damping characteristics in the material. The high temperature superconductor materials have crystals of radially similar texture and a superconductive temperature of up to 92° kelvin (corresponding to −181° C.) so that the superconductor materials may be kept below superconductive temperature also by fluid nitrogen. It is also conceivable to us other superconductor materials.

The cooling device 29 includes a closed cryostat that works on the Stirling principle. It is also possible to provide cooling machines that operate according to the Gifford-McMahon or the pulse-tube method. The heat elimination line 30 and the cooling jacket 28a consist of an excellently heat conducting material, in particular copper. Separated by an interspace 31, the bearing shell 28, the cooling jacket 28a and the heat elimination line 30 are enveloped by an intermediate casing 32 that is embedded in the bearing block 8 and 9. For increased insulation of the bearing shell 28 towards ambience, the interspace 31 is evacuated. The residual gas pressure in the interspace 31 is less than $10^{-2}$ Pascal. For absorption of residual gas molecules, activated carbon cells 33 are provided in the cooling jacket 28a, raising the quality of the vacuum by absorption of gas molecules upon cooling. The second bearing member 24 and in particular the bearing shell 28 have a U-shaped cross section with a depression 34 that houses the first bearing member 22. At least in the vicinity of the depression 34, the intermediate casing 32 has a protective coating 35 of the same material as the protective coating 27. For accurate maintenance of the shape of the bearing clearance 23 as well as of the vacuum gap 36 that is formed between the protective coating 35 and the bearing shell 28, constituting part of the interspace 31, this area of the intermediate casing 32 is provided a supporting layer 37 of glass fiber reinforced or carbon fiber reinforced plastic material. This arrangement enables an insulation to be maintained for a thermal gradient of 250° kelvin and more in the vicinity of the bearing clearance over a length of few millimeters so that the superconductive bearing shell 28 is kept below superconductive temperature on the one hand and the fluid 3 does not freeze in the bearing clearance 23 on the other.

The driving unit 15, which is disposed in vicinity to the bearing 14, comprises a stator 39 disposed in a stator block 38 as well as a rotor 40 which is single-piece with the shaft-driving butt 12. The stator 39 has an upwardly open coil core 41 of the cross-sectional shape of a sector of a circle with coil pins 42 that project inwards radially of the axis of rotation 10 and are formed in one piece with the coil core 41. Driving coils 43 with connections 44 are coiled up on the pins 42 in such a way that the magnetic fields produced by the driving coils 43 extend substantially radially of the axis of rotation 10. The connections 44 are customarily connected to a current supply/control system. The rotor 40 has a rotor jacket 45 that concentrically envelops the butt 12 and in which permanent bar magnets 46 of alternating poles are inserted for a sequence of poles N, S, N, S, . . . to be produced along the circumference. The magnetic fields produced by the permanent bar magnets 46 extend substantially radially of the axis of rotation 10. The material selected for the bar magnets 46 may be the same as that selected for the ring magnets 25. The rotor 40 may have a short circuit armature. Electrically triggering the adjacent driving coils 43 takes place in such a chronological order that the magnetic field produced by a driving coil 43 repels the rotor 40 in a direction of rotation 47 and that simultaneously the magnetic field produced by the driving coil 43 ensuing in the direction of rotation 47 attracts the rotor 40. In this way, torque is transmitted to the rotor 40. This principle is known from normal rotary current motors. By alternative, use may be made of another rotary current actuation that has the special feature of the driving coil being open unilaterally so that the shaft-driving butt 12 can be lifted out upwards.

The following is a description of the mode of functioning of the device 1 during operation and in particular the function mode of the bearings 13 and 14. At the beginning, the unit formed by the carrying arrangement 5 as well as the shaft butt 11 and the shaft-driving butt 12 is held by a robot arm (not shown) outside the container 4 and the second bearing members 24. In this position, the carrying arrangement 5 is equipped with silicon wafers 2 by one or several rods 19 being removed, by the silicon wafers 2 being inserted and then arrested by reinsertion of the support rods 19. Then the unit consisting of the carrying arrangement 5, shaft butt 11 and shaft-driving butt 12 is lifted by the robot arm into the position seen in FIG. 2 and mechanically held in a so-called quench-in position. Then the bearing shells 28 are cooled to a temperature below the superconductive temperature of the superconductive material. Afterwards, the carrying arrangement 5 is released by the robot arm, "floating" separately through a bearing clearance 23 in the second bearing members 24. This is the result of diamagnetic interaction which consists in that, under the influence of an external magnetic field, characteristic currents are generated in the superconductive bearing shell 28, which produce a precisely opposite magnetic flux. Since the generated currents flow continuously and substantially without resistance and themselves produce an opposed magnetic field that repels the magnetic field of the ring magnets 25, the system works substantially without power. In this way the first bearing member 22 and the second bearing member 24 repel each other. Changes in position produce retroactive magnetic forces. Arranging several ring magnets 25 along the axis of rotation 10 confers rigidity to the mounting of the shaft axially as well as radially of the axis of rotation 10. The bearings 13, 14 have an axial and radial rigidity of in each case more than 80 N/mm, in particular of more than 200 N/mm. By fixing the magnetic flux in the superconductor, the so-called pinning effect, any displacements in the axial or radial direction produce counterforces with a tendency towards restoring the first bearing member 22 in the initial position, which is called a key-lock principle. This explains the high bearing rigidity and automatic centering of the first bearing member 22 relative to the second bearing member 24. The bearings 13, 14 absorb oscillations of the shaft in a frequency range of 0.1 Hz to 2 kHz. The type of mounting permits speeds of up to 10,000 min$^{-1}$. The weight of the mounted unit may be 20 kg and more. Due to the contactless way of mounting, the bearings 13, 14 are not subject to wear. The bearings 13, 14 have an intrinsic damping characteristic, because minor changes of magnetic flux, for instance in the radial magnetization of the ring magnets 25, produce eddy currents and motions of the vortex grid in the superconductive material. The energies generated are released in the superconductor, absorbing oscillations of the shaft. The bearings 13, 14 function passively i.e., without electronic control, thus being reliable and maintenance-free. In another method of removing the unit of carrying arrangement 5 and butts 11, 12, the cooling device 29 of the bearing shells 28 is deactivated for a short time, after this unit has been seized by a robot arm. The temperature of the bearing shells 28 rises nearly to superconductive temperature. This is accompanied with a reduction of the magnetic forces without the floating condition of the unit being affected, which can now easily be lifted out the second bearing members 24 for removal of the treated silicon wafers 2. Special handiness resides in the simple removal and reinsertion of the carrying arrangement 5 in the bearing members 24. There is no need of any control functions in the area of the bearings.

Due to frictionless non-contact operation of the bearings 13, 14, there is a strong reduction of the number of particles in the fluid 3 that can normally be found with bearing wear-off, affecting the quality of the silicon wafers 2. As a result, rotating treatment of the silicon wafers 2 can be effected, which has the advantage of high homogeneity of the liquid, solid or gaseous processes that take place on the surface of the silicon wafers 2. Another advantage of the rotation of the silicon wafers 2 resides in the fact that bubbles are prevented from adhering to the surface, which would otherwise lead to fluids or gases not being able to act on this surface spot, flaws being produced.

Figure 5:
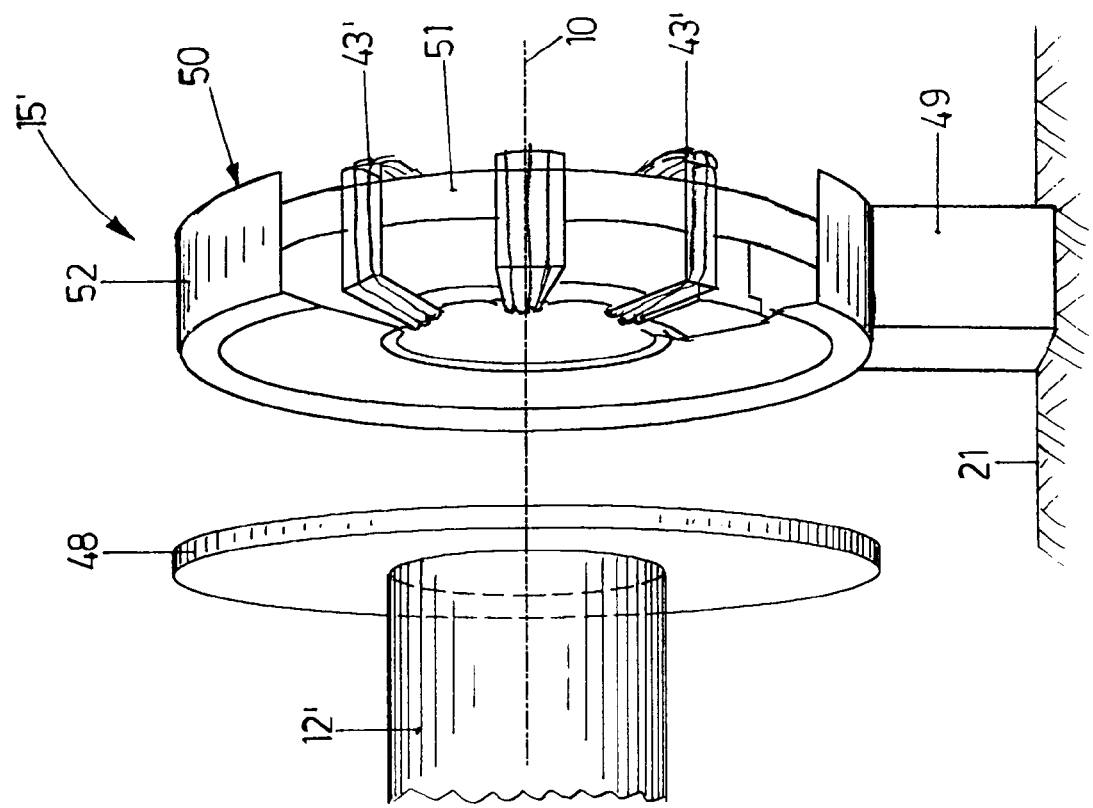
FIG. 5 is a partial view of the invention in a second embodiment.

A second embodiment of the invention will be described below, taken in conjunction with FIG. 5. Identical parts have the same reference numerals as in the first embodiment;

differing parts of identical function have the same reference numeral provided with a prime. As for the rest, reference is made to the description of the first embodiment. The second embodiment differs from the first embodiment only by the design of the driving unit 15'. Provided on the right end—in FIG. 5—of the shaft-driving butt 12' is a hysteresis disk 48 which is perpendicular to the axis of rotation 10 and of a material with a distinct hysteresis curve. In vicinity thereto, provision is made for a coil unit with a rotary current winding in the form of a coil ring 50 that is concentric of the axis of rotation 10 and supports itself via a support 49 on the machine bottom 21. The coil ring 50 has a core 51 with driving coils 43' wound around it at various positions regularly spaced along the core 51. For protection against the fluid 3, the core 51 and the driving coils 43' are provided with a protective coating 52 of the same material as the protective coating 27. The same is true for the butt 12' and the disk 48. The mode of operation of such an actuation is familiar. Upon magnetic reversal of hysteretic iron, phase displacement takes place between exciting magnetic field intensity and magnetic induction, which is linked up with the geometric shape of the hysteresis loop and moreover depends on the amplitude of alternating excitation. The hysteresis drive according to FIG. 5 makes use of this principle. The hysteresis disk 48 is a solid disk and is easy to encase. It is also conceivable to embody the hysteresis disk 48 as a pipe. During start-up, the hysteresis drive behaves like an asynchronous motor; synchronous run results once the nominal speed has been reached. The advantage of this actuation consists above all in that not bar magnets 46 are needed and in that synchronous actuation can be established.

Figure 6:
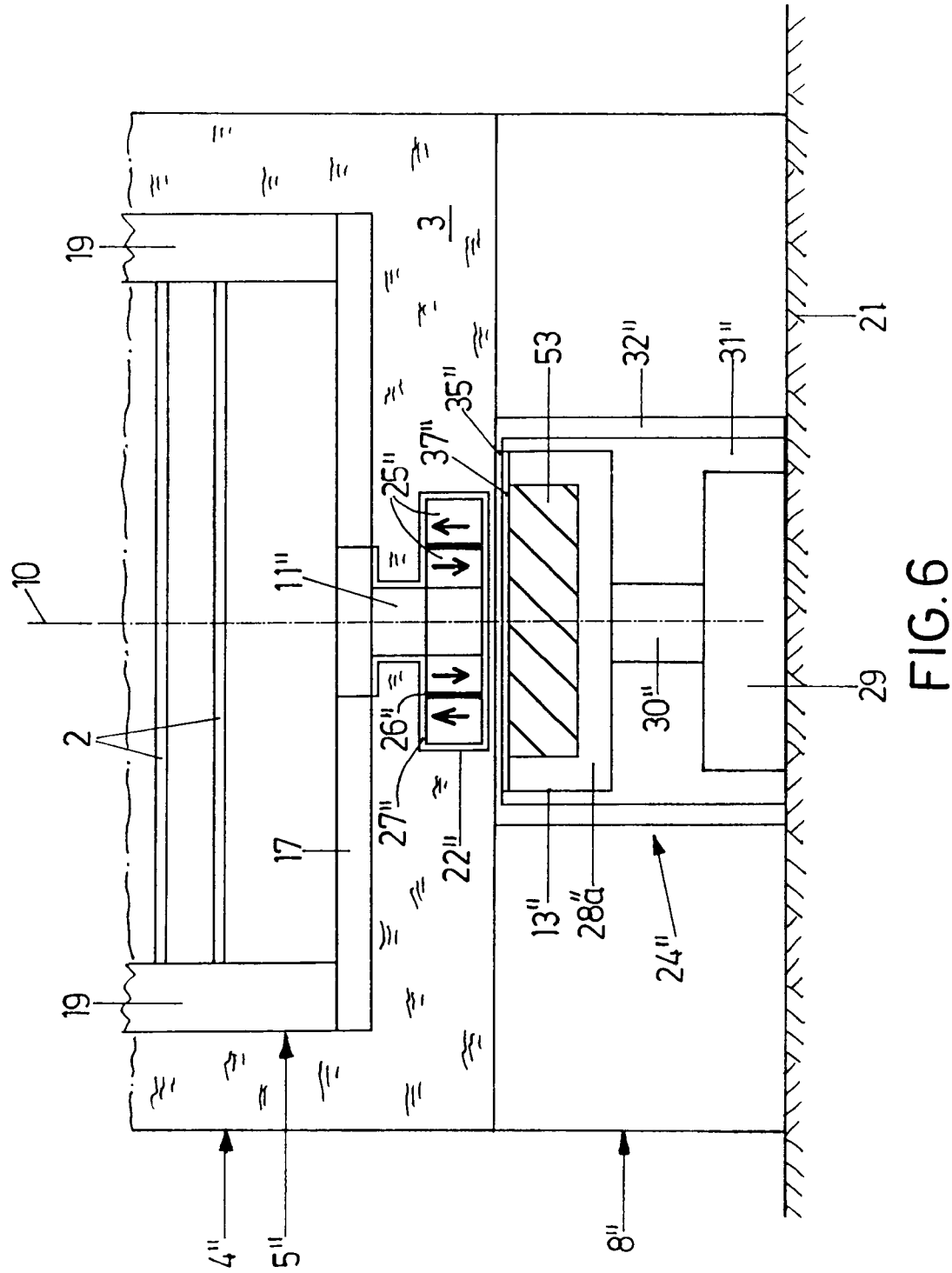
FIG. 6 is a partial cross-sectional view of the invention in a third embodiment.

In the following, a third embodiment of the invention will be described, taken in conjunction with FIG. 6. Identical parts have the same reference numerals as in the first embodiment; differing parts of equivalent function have the same reference numeral provided with a double prime. Otherwise, reference is made to the description of the first embodiment. The central difference of the third embodiment from the first embodiment resides in that the axis of rotation 10 is not horizontal, but vertical. Provided in the bearing block 8" is the second bearing member 24" which is designed in the same way as the bearing member 24 of the first embodiment. The only difference resides in that a bearing disk 53 of superconductive material is provided instead of the bearing shell 28. Disposed above this disk 53 is the container 4" in which the carrying arrangement 5" is disposed with a vertical axis of rotation 10. The first bearing member 22" is provided on the lower end—in FIG. 6—of the carrying arrangement 5", having ring magnets 25" which are concentric of each other and parallel to the axis of rotation. Provision can be made for more than two concentric ring magnets 25". The magnetization of adjacent ring magnets 25" is alternating. Additional annular disks 26" of inferior permeability may be provided between the ring magnets 25". The bearing 13" possesses axial as well as radial bearing rigidity. A driving unit 15' as described in the second embodiment is provided on the upper end (not seen in FIG. 6) of the carrying arrangement 5" for actuation thereof. For removal of the carrying arrangement 5" from the container 4", the coil ring 50 is pivoted crosswise of the axis of rotation 10 so that the carrying arrangement 5" can be lifted upwards out the container 4".

It is also possible to prolong the shaft butt 11' and to provide another driving unit as for instance in the first embodiment. Thus the carrying arrangement 5" may be kept open upwards, allowing frontal charging with a separate carrier cage of for instance two shells. The shells have slotted axial rods with the silicon wafers 2 inserted therein. The two shells are pressed one upon the other, placed axially from above into the carrying arrangement 5' and fixed in axial guides.

Figure 7:
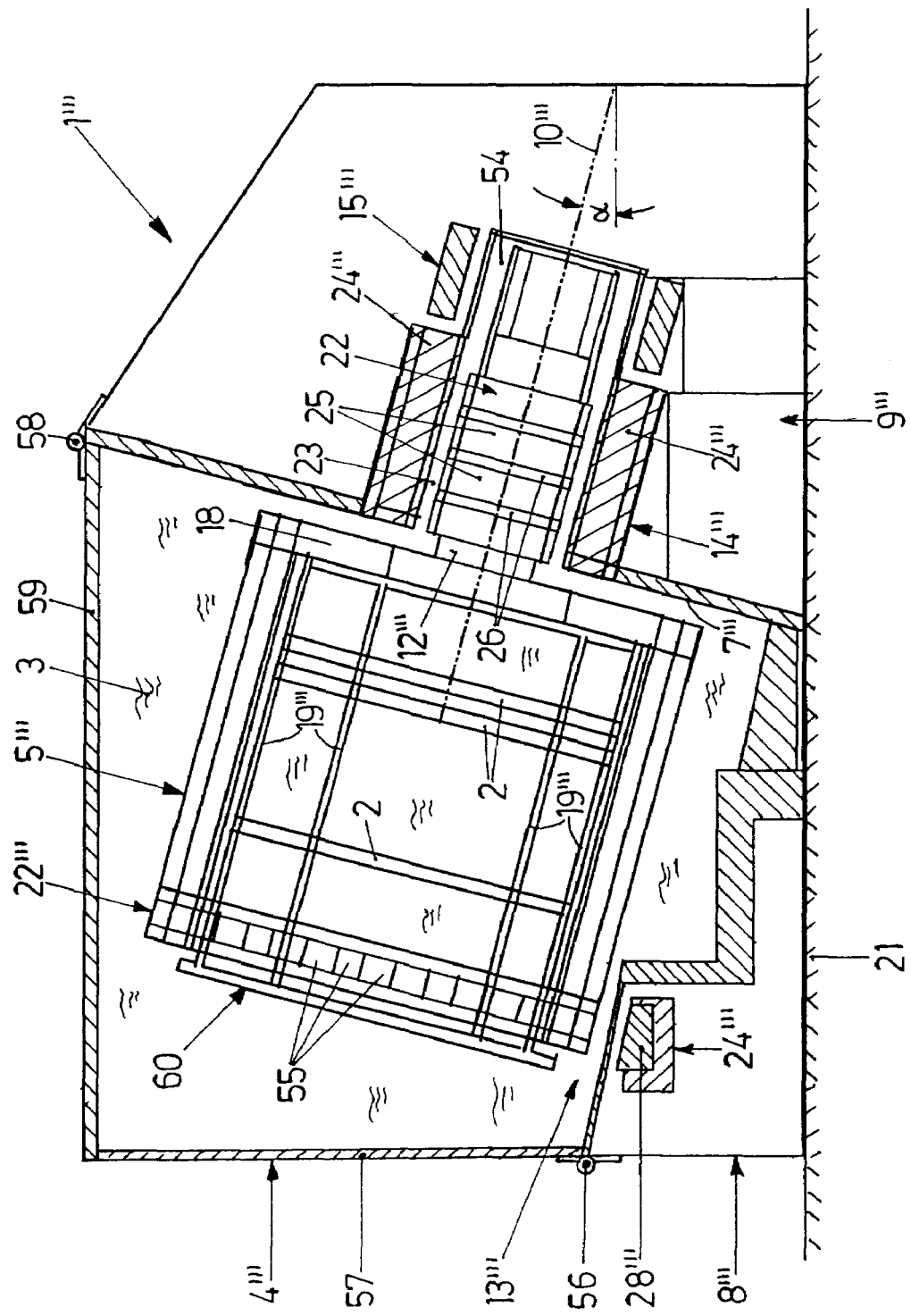
FIG. 7 is a cross-sectional view of the invention in a fourth embodiment.

Of course, the bearings 13, 14 of the first embodiment and the bearing 13" of the third embodiment may be combined. In this way, bearing rigidity in the radial and axial direction can be increased and the axis of rotation may take an angle ranging between 0 and 90° relative to the horizontal i.e., any position between a horizontal and a vertical arrangement. A fourth embodiment of the invention will be described below, taken in conjunction with FIG. 7. Identical parts have the same reference numerals as in the first embodiment which reference is made to. Parts of differing construction but identical function have the same reference numerals provided with a triple prime. The device 1''' comprises a bearing block 9''', in which an annular cylindrical bearing member 24''' and an annular cylindrical driving unit 15''' are provided concentrically of an axis of rotation 10''', encircling an annular cylindrical bearing space 54 in the form of a blind hole. The shaft-driving butt 12''' is disposed centrally in this space 54. The axis of rotation 10''' is inclined by an angle $\alpha$ relative to the horizontal, with $0°<\alpha<90°$, in particular $5°<\alpha<30°$, and by special advantage $\alpha=15°$ applying to the angle $\alpha$. The carrying arrangement 5''' comprises an auxiliary carrying basket 60, which can be inserted from outside parallel to the axis of rotation 10''' and accommodates the silicon wafers 2. The basket 60 can be inserted in, or removed from, the carrying arrangement 5''' at one end thereof. The carrying arrangement 5''' is disposed concentrically of the axis of rotation 10''' and connected to the shaft driving butt 12'''. Circumferentially provided on the end of the carrying arrangement 5''' that is turned away from the shaft driving butt 12''' is the bearing member 22". It possesses permanent magnets 55 of radial orientation which adjoin one another along the circumference. The bearing block 8''' with the bearing member 24''' is provided underneath the bearing member 22" in FIG. 7. The bearing member 24''' has the shape of a segment of a circle, enclosing the bearing member 22" partially. By means of the bearing 13''', the carrying arrangement 5''' is supported in the vertical direction and stabilized crosswise thereof. The container 4''' has a vertical side wall 57, which is joined to the bearing block 8''' via a hinge 56, and a side wall 59, which is joined to the upper end of the bearing block 9''' via a hinge 58. The side walls 57 and 59 can be pivoted outwards.

The following is a detailed description of the operation of the device 1'''. For the carrying arrangement 5''' to be inserted, the side walls 57 and 59 are pivoted open, which permits access to the bearing space 54. Slightly inclined relative to the horizontal, the shaft driving butt 12''' is inserted into the bearing space 54. Then the superconductive bearing member 24''' is cooled until becoming superconductive. Owing to the mechanism described above, the carrying arrangement 5''' is now mounted without friction. For support of the carrying arrangement 5''', the bearing member 24''' of the bearing 13''' is cooled below superconductive temperature too. Advantages of this arrangement reside in the possibility of frontally charging the carrying arrangement 5'''. The entire carrying arrangement 5''' inclusive of the basket 60 may be removed from the device 1 along the axis of rotation 10''' and subjected to thorough cleaning.

Figure 8:
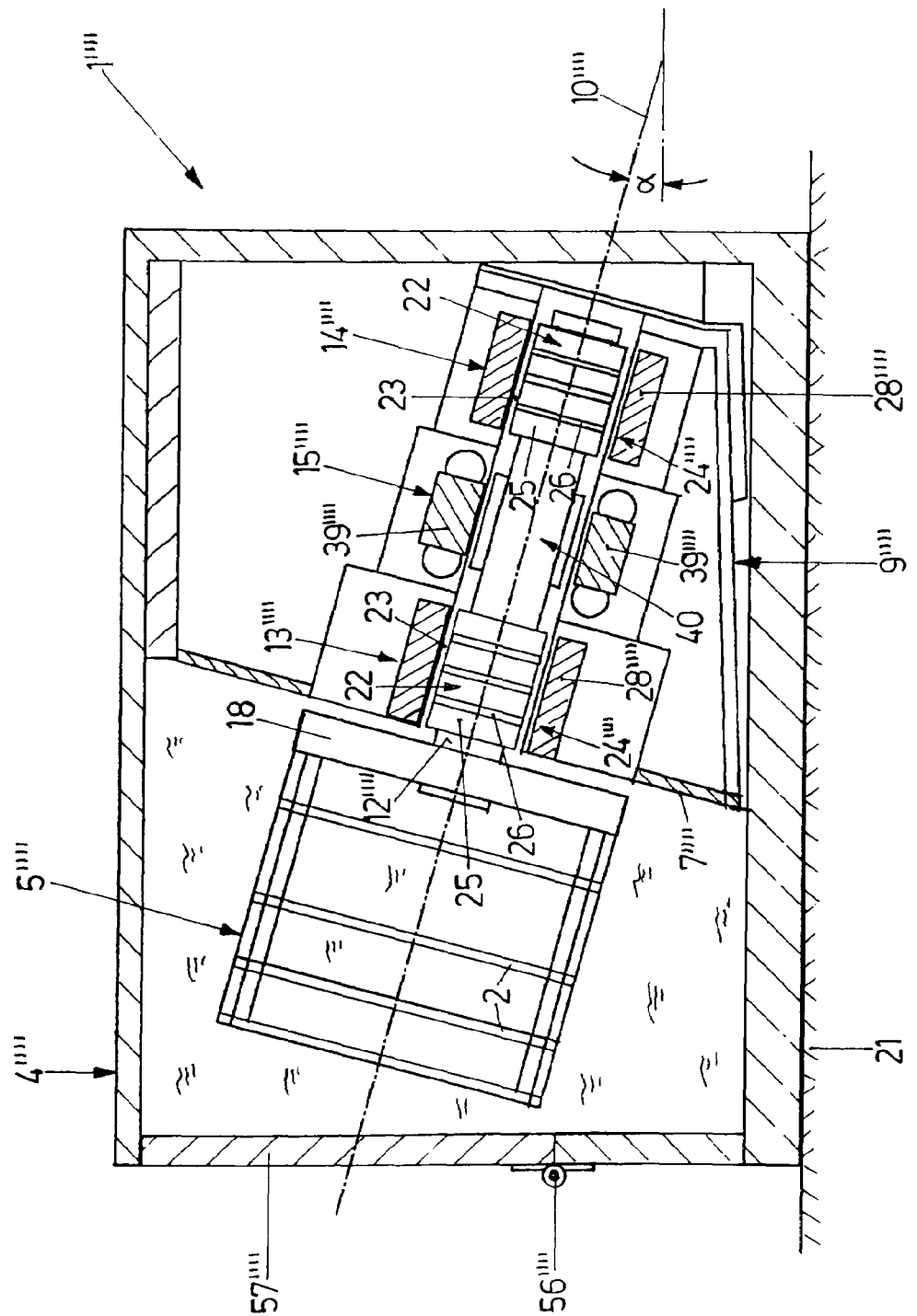
FIG. 8 is a cross-sectional view of the invention in a fifth embodiment.

A fifth embodiment is described in the following, taken in conjunction with FIG. 8. Identical parts have the same reference numerals as in the first embodiment which reference is made to. Parts of differing construction, but identical function have the same reference numeral provided with four prime marks. The essential difference of the device 1"" from the device 1 resides in that the carrying arrangement 5"" is not mounted on both axial ends, but only on one side. To this end, the bearing 13"", the driving unit 15"" and the bearing 14"" are provided in vicinity to the carrying arrangement 5"" in the bearing block 9"". The second bearing members 24"" as well as the stator 39"" encircle the shaft driving butt 12"" annular cylindrically. The container 4"" has a vertical side wall 57"", which is pivotable and joined thereto by a hinge 56"". The axis of rotation 10"" is inclined by an angle α of approximately 15° relative to the horizontal.

Upon operation of the device 1"", the carrying arrangement 5"", which is loaded with silicon wafers 2, may be rotated in the container 5"" about the axis of rotation 10"". The advantage of this embodiment resides in that the silicon wafers can be removed along the axis of rotation 10"". Moreover, the unit of the carrying arrangement 5''' and shaft driving butt 12"" can also be removed along the axis of rotation 10"" for cleaning or repair purposes. There is no need of any separate support such as by the bearing 13''' of the fourth embodiment.

Figure 9:
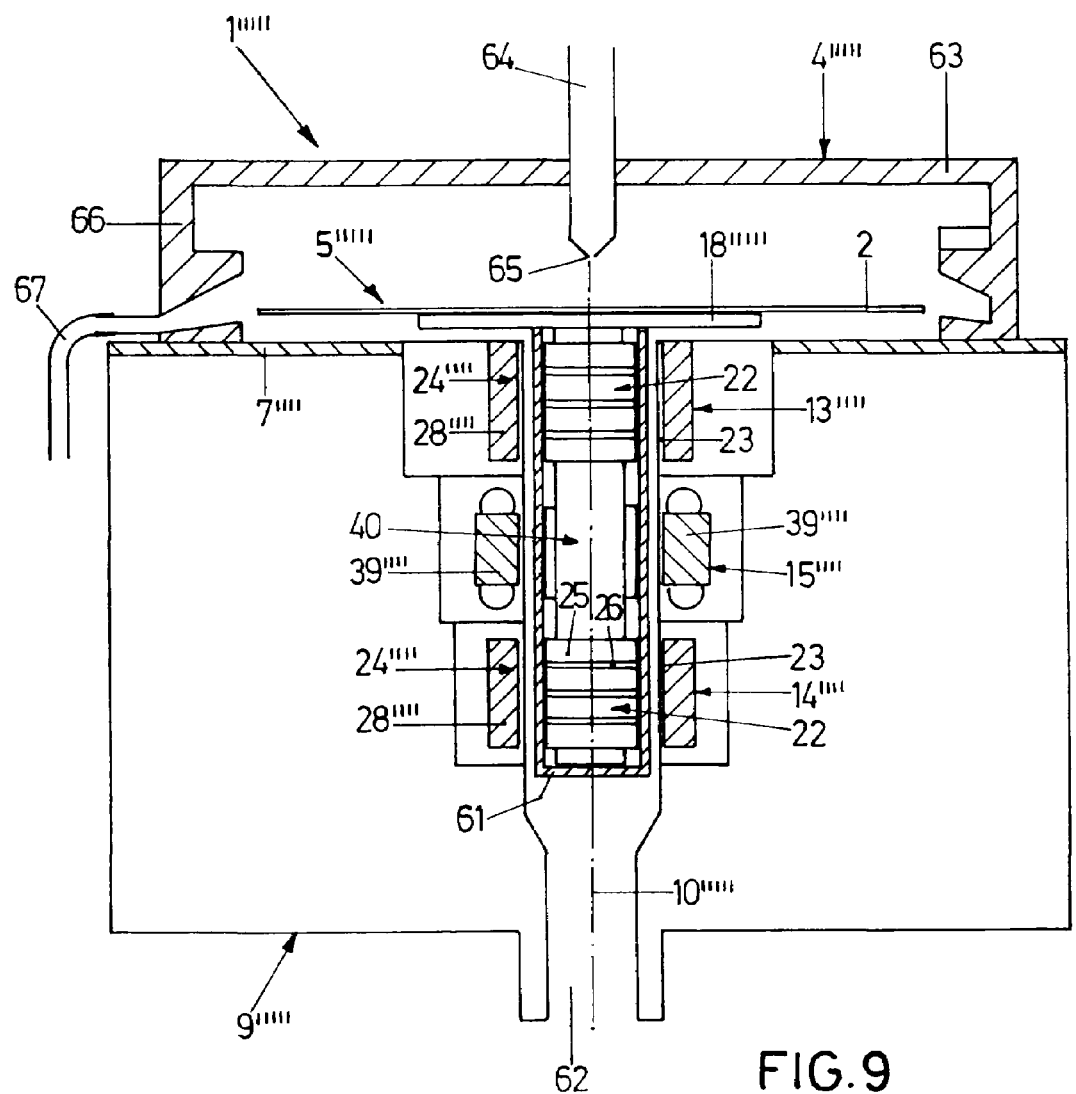
FIG. 9 is a cross-sectional view of the invention in a sixth embodiment.

A sixth embodiment of the invention is described below, taken in conjunction with FIG. 9. Identical parts have the same reference numerals as in the fifth embodiment seen in FIG. 8 which reference is made to. Parts of differing construction and identical function have the same reference numerals provided with five prime marks. The structure of the bearing members 24"" as well as the driving unit 15"" corresponds to the structure according to the fifth embodiment. The same is true for the structure of the rotor 40 with the exception that the rotor 40 is encased by a resistant cylindrical jacket 61 of plastic material. As opposed to the fifth embodiment, the arrangement of the rotor 40 is selected for the axis of rotation 10""' to be vertical. At its lower end, the bearing block 9"" has a drain outlet 62 which is connected to the annular space between the jacket 61 and the bearing members 24"" and the driving unit 15"". The support disk 18""', which is connected with the rotor 40, is substantially horizontal, its upper side serving as a support for a silicon wafer 2. The container 4""', which is designed as a cover 63, is disposed laterally above the silicon wafer 2. Of course, it is possible to operate the device 1"" without the container 4""'. A supply line 64 is disposed centrally in the cover 63, having a nozzle 65 in the space that is defined by the cover 63. Laterally below the silicon wafer 2, the cover 63 has an edge 66 with a discharge line 67.

The mode of operation of the device 1"" according to the sixth embodiment is described in the following. As in the fifth embodiment, the support disk 18""' is mounted for frictionless rotary actuation. For application of photosensitive resist on the silicon wafer 2, a drop of photosensitive resist is applied by the nozzle 5 centrally on the rotating silicon wafer 2. Owing to centrifugal forces, the photosensitive resist rapidly spreads in a thin and homogeneous layer on the surface of the silicon wafer 2. Excessive resist is discharged through the discharge line 67 and the drain outlet 62. The device 1"" may moreover be used for the etching and cleaning processes specified in the preceding examples of embodiment. Moreover, the silicon wafer 2 can be centrifuged in the device 1"" until it is dry.

Furthermore, the device 1"" may be used for inspection of the crystal and surface structure of the silicon wafer 2 for flaws. The way in which the rotor 40 is mounted enables the silicon wafer 2 to be accelerated very rapidly to very high speeds as described at the outset. Fissures and other flaws in the crystal structure of the silicon wafer 2 grow with correspondingly high centrifugal forces and can be determined easily. Possibly these flaws even lead to breach of the wafer 2. Consequently, the device 1"" may also be used for quality control without use of the treatment fluid 3. This type of quality control is also possible with the devices according to the first to fifth embodiment.

The invention claimed is:

1. A device for treating objects, in particular silicon wafers, with a fluid, comprising
    (a) a container for accommodation of the fluid, said container having adjacent bearing blocks;
    (b) a rotatable carrying arrangement, which is at least partially disposed in the container, serving for accommodation of the objects to be treated; and
    (c) a rotatably drivable shaft, which is run on at least one bearing and joined to the carrying arrangement;
    (d) with the at least one bearing including
        (i) a first bearing member joined to the shaft,
        (ii) a second bearing member in the vicinity of the first bearing member, said second bearing member containing high temperature superconductive material which is maintained at temperatures at which the superconductive material is superconductive,
        (iii) with the first bearing member being kept spaced and stabilized from the second bearing member by magnetic forces,
        (iv) a third bearing member around the second bearing member, the third bearing member consisting of a protective coating and a supporting layer providing a vacuum gap and producing thermal insulation of the second bearing member; and
        (v) a fourth bearing member comprising a cooling jacket combined with activated carbon cells for cryo-pumping an insulating vacuum.

2. The device according to claim 1, wherein the at least one bearing comprises a second bearing member in the shape of a bearing shell of superconductive material.

3. The device according to claim 1, wherein the second bearing member comprises a bearing shell of superconductive material.

4. The device according to claim 1, wherein the first bearing member has permanent ring magnets.

5. The device according to claim 1, wherein the second bearing member has a plane bearing disk of superconductive material.

6. The device according to claim 5, wherein the first bearing member comprises permanent ring magnets which are disposed concentrically of each other.

7. The device according to claim 1, wherein a driving unit is provided for actuation of the shaft.

8. The device according to claim 7, wherein the driving unit comprises a coil core which at least partially encircles the shaft.

9. The device according to claim 7, wherein the driving unit includes a hysteresis disk, which is joined to the shaft, and a stationary coil unit for the generation of a magnetic field which interacts with the hysteresis disk for actuation of the shaft.

10. The device according to claim 1, wherein the first bearing member and/or the second bearing member and/or the container and/or the shaft are provided with a coating that is resistant to the fluid.

11. A device according to claim 1, wherein the first bearing member is removable from the second bearing member.

12. The device according to claim 1, wherein the shaft and a horizontal line make a freely selectable angle α wherein α is 0°<α<90°.

13. The device according to claim 1, wherein the shaft is substantially vertical and the carrying arrangement comprises a substantially horizontal support disk.

14. The device according to claim 13, wherein the support disk serves as a support for an object to be treated.

15. The device according to claim 1, wherein α is from 5° to 30°.

16. A device for treating objects, in particular silicon wafers, with a liquid, comprising:
   a. a container for accommodating the liquid, said container having adjacent bearing blocks;
   b. a rotatable carrying arrangement which is at least partially disposed in the container, serving to accommodate the objects to be treated; and
   c. a rotatably drivable shaft, which shaft is run on at least one bearing and joined to the carrying arrangement; with the at least one bearing including
      i. a first bearing member joined to the shaft;
      ii. a second bearing member in the vicinity of the first bearing member having the shape of an upwardly open bearing shell and containing high temperature superconductive material which is maintained at temperatures at which the superconductive material is superconductive,
      iii. with the first bearing member being kept spaced and stabilized from the second bearing member by magnetic forces;
      iv. a third bearing member consisting of a protective coating and a supporting layer providing a vacuum gap and producing thermal insulation of the second bearing member; and
      v. a fourth bearing member comprising a cooling jacket combined with activated carbon cells for cryo-pumping an insulating vacuum.

17. The device according to claim 16 wherein the second bearing member comprises a bearing shell of superconductive material.

18. The device according to claim 16 wherein the first bearing member has permanent ring magnets.

19. The device according to claim 16 wherein the second bearing member has a plane bearing disk of superconductive material.

20. The device according to claim 19 wherein the first bearing member comprises permanent ring magnets which are disposed concentrically to each other.

21. The device according to claim 19 wherein a driving unit is provided for actuating the shaft.

22. The device according to claim 21 wherein the driving unit comprises a coil core which at least partially encircles the shaft.

23. The device according to claim 21 wherein the driving unit includes a hysteresis disk, which is joined to the shaft, and a stationary coil unit for the generation of a magnetic filed which interacts with the hysteresis disk for actuating the shaft.

24. The device according to claim 16 wherein at least one of the first bearing member, the second bearing member, the container, and the shaft are provided with a coating that is resistant to the fluid.

25. The device according to claim 16 wherein the first bearing member is removable from the second bearing member.

26. The device according to claim 16 wherein the shaft and a horizontal line make a freely selectable angle α wherein α is 0°<α<90°.

27. The device according to claim 26 wherein α is from 5° to 30°.

28. The device according to claim 16 wherein the shaft is substantially vertical and the carrying arrangement comprises a substantially horizontal support disk.

29. The device according to claim 28 wherein the support disk serves as a support for an object to be treated.

* * * * *